No. 799,510. PATENTED SEPT. 12, 1905.
W. E. WILLIAMS.
IRONWORK STRUCTURE.
APPLICATION FILED NOV. 4, 1904.
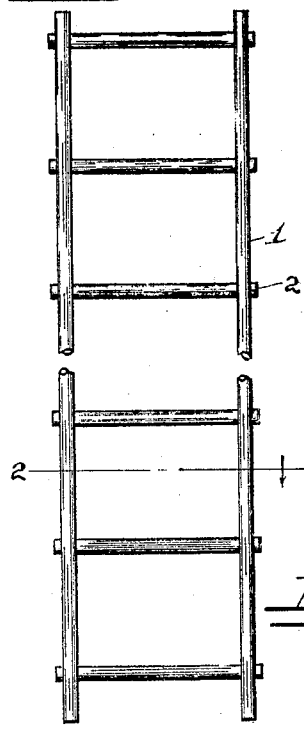
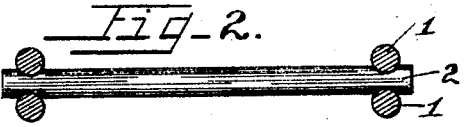
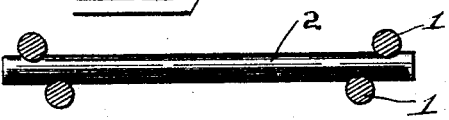
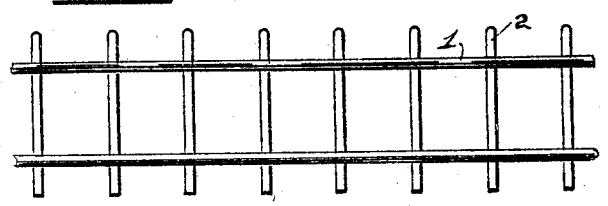
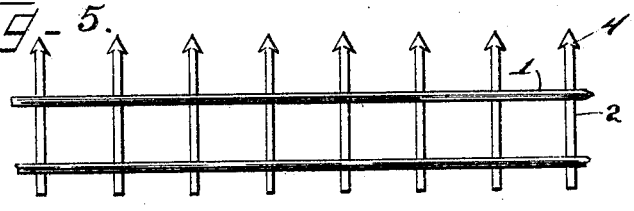
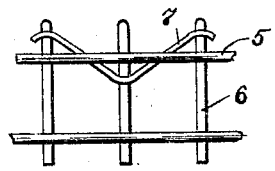
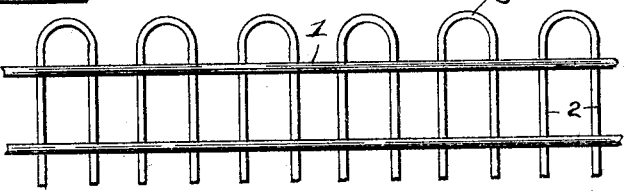
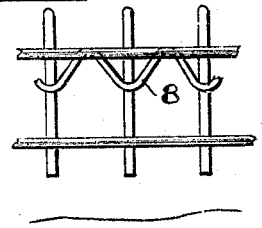
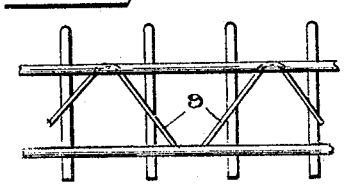
Witnesses
Inventor
William E. Williams,

UNITED STATES PATENT OFFICE.

WILLIAM ERASTUS WILLIAMS, OF CHICAGO, ILLINOIS.

IRONWORK STRUCTURE.

No. 799,510.  Specification of Letters Patent.  Patented Sept. 12, 1905.

Application filed November 4, 1904. Serial No. 231,375.

*To all whom it may concern:*

Be it known that I, WILLIAM ERASTUS WILLIAMS, a citizen of the United States of America, and a resident of Chicago, county of Cook, and State of Illinois, have invented certain new and useful Improvements in Ironwork Structures, of which the following is a specification.

The object of this invention is to provide an ironwork structure suitable for ladders, fences, gratings, and other devices wherein the conditions are analogous.

The novel structure involves placing transverse rods between two slightly-separated parallel rods and welding the three together at the crossing-points.

In the accompanying drawings, Figure 1 shows a ladder made in accordance with my invention. Fig. 2 represents a cross-section of the ladder. Fig. 3 is a view similar to Fig. 2, showing a slightly different arrangement of parts. Figs. 4, 5, 6, 7, 8, and 9 are side elevations of different fence constructions.

In Figs. 1, 2, 3, 4, 5 the structures consist of two parallel sets or pairs of parallel rods 1, and these pairs, as well as the rods of each pair, are connected at regular short intervals by transverse rods 2, perpendicular to the rods 1, passing between those of each pair and welded to both rods of both pairs at each point of crossing or intersection. Fig. 5 shows the transverse rods as having ornamental heads 4. In Fig. 3 the rods 1 of each pair are shown as slightly offset in position, so that each may be welded to the members 2 independently of its companion. In Fig. 6 the transverse rods 2 are shown as integrally connected in pairs by curved portions 3. Fig. 7 shows a serpentine rod 7 as woven into the structure and welded to the runners 5 and cross-bars 6 at every point of contact. Figs. 8 and 9 show slightly different arrangements of rods 8 and 9, corresponding, respectively, to the rod 7 of Fig. 7.

The welding is usually done electrically by merely pressing the parts between suitable electrodes at the welding-points, and thus the parts may be very rapidly united without any distortion and at a trifling cost. Obviously the structure when completed is extremely strong and rigid, offering great resistance to deflecting strains as well as all others.

What I claim is—

1. An ironwork structure composed of two slightly-separated, parallel rods, a second, parallel, relatively distant pair of parallel rods in a different plane, and a series of spaced transverse rods passing between the two rods of each pair and each welded to each rod of each pair.

2. An ironwork structure composed of parallel pairs of slightly-separated rods, and transverse rods connecting the pairs and lying between the rods of each pair and integrally united to each rod of each pair.

3. An ironwork structure composed of a series of parallel spaced rods in a plane, a pair of widely-separated parallel rods crossing all the rods of said series upon the same side of said plane and each welded to each rod of the series, a second parallel pair of rods which are slightly separated from the rods of the first pair, respectively, and similarly cross, and are welded to, the rods of the series, but upon the opposite side thereof, and diagonal rods following the general plane of the structure and welded to its members to stiffen the same.

4. An ironwork structure composed of parallel pairs of parallel rods, the pairs being in different planes rods connecting the pairs at short intervals and passing perpendicularly to the pairs, between the rods of each pair and welded to both, and a rod passing diagonally back and forth in the structure thus formed and welded to the members of the latter at each point of crossing.

Signed at Chicago this 10th day of October, 1904.

WILLIAM ERASTUS WILLIAMS.

Witnesses:
  W. N. SHROHON,
  J. W. ANGELL.